United States Patent
Lahav et al.

(10) Patent No.: US 9,560,839 B2
(45) Date of Patent: Feb. 7, 2017

(54) PHYSICO-CHEMICAL PROCESS FOR REMOVAL OF NITROGEN SPECIES FROM RECIRCULATED AQUACULTURE SYSTEMS

(75) Inventors: Ori Lahav, Givat Ela (IL); Youri Gendel, Haifa (IL); Noam Mozes, Eilat (IL); Ayana Benet Perlberg, Kibbutz Ein Carmel (IL); Yuri Hanin, Kiryat Motzkin (IL)

(73) Assignee: TECHNION RESEARCH AND DEVELOPMENT FOUNDATION LTD., Haifa (IL)

( * ) Notice: Subject to any disclaimer, the term of this patent is extended or adjusted under 35 U.S.C. 154(b) by 660 days.

(21) Appl. No.: 13/988,263

(22) PCT Filed: Nov. 17, 2011

(86) PCT No.: PCT/IL2011/050015
§ 371 (c)(1),
(2), (4) Date: Jul. 24, 2013

(87) PCT Pub. No.: WO2012/066554
PCT Pub. Date: May 24, 2012

(65) Prior Publication Data
US 2013/0292335 A1   Nov. 7, 2013

Related U.S. Application Data

(60) Provisional application No. 61/414,447, filed on Nov. 17, 2010.

(51) Int. Cl.
*A01K 63/04*   (2006.01)
*C02F 1/46*   (2006.01)
(Continued)

(52) U.S. Cl.
CPC ............... *A01K 63/04* (2013.01); *B01J 49/00* (2013.01); *C02F 1/46* (2013.01); *C02F 1/4674* (2013.01);
(Continued)

(58) Field of Classification Search
CPC ....... A01K 63/04; B01J 49/0069; B01J 49/00; B01J 49/003; B01J 49/0065; B01J 49/0008; C02F 1/586; C02F 2209/14; C02F 2303/16; C02F 1/66; C02F 2209/06; C02F 2303/18; C02F 2303/185; C02F 1/46; C02F 7/00; C02F 2101/105; C02F 2209/24
See application file for complete search history.

(56) References Cited

U.S. PATENT DOCUMENTS 3,723,308 A * 3/1973 Breck .................. B01J 39/02
                                                210/681
3,931,003 A   1/1976 Jorgensen
(Continued)

FOREIGN PATENT DOCUMENTS

DE   19853182 A1   5/2000
DE   10240572 A1   3/2004
(Continued)

OTHER PUBLICATIONS

Gendel "A novel approach for ammonia removal from fresh-water recirculated aquaculture systems, comprising ion exchange and electrochemical regeneration". Aquacultural Engineering 52: 27-38 (2013).
(Continued)

*Primary Examiner* — Lucas Stelling
*Assistant Examiner* — Angel Olivera
(74) *Attorney, Agent, or Firm* — Browdy and Neimark, PLLC

(57) ABSTRACT

The present invention provides processes for removing nitrogen species from fresh water or high salinity water
(Continued)

recirculated aquaculture systems. The processes are based on physico-chemical treatments which are performed at ambient temperatures and at low pH values thus keeping the total ammonia nitrogen concentrations below a value which is considered detrimental for the growth or survival rate of cultured fish/shrimp.

18 Claims, 9 Drawing Sheets

(51) Int. Cl.
    C02F 1/467    (2006.01)
    C02F 1/58     (2006.01)
    B01J 49/00    (2006.01)
    C02F 101/10   (2006.01)
    C02F 1/20     (2006.01)
    C02F 1/42     (2006.01)
    C02F 1/66     (2006.01)
    C02F 101/16   (2006.01)

(52) U.S. Cl.
    CPC ........... C02F 1/586 (2013.01); B01D 2256/10 (2013.01); B01J 49/0065 (2013.01); C02F 1/20 (2013.01); C02F 1/42 (2013.01); C02F 1/66 (2013.01); C02F 2101/105 (2013.01); C02F 2101/16 (2013.01); C02F 2209/06 (2013.01); C02F 2209/14 (2013.01); C02F 2209/16 (2013.01); C02F 2303/16 (2013.01)

(56) References Cited

U.S. PATENT DOCUMENTS

| | | | |
|---|---|---|---|
| 4,344,851 A | 8/1982 | Sherman | |
| 4,517,084 A | 5/1985 | Pincon | |
| 4,522,727 A | 6/1985 | Weber | |
| 4,614,591 A | 9/1986 | Jorgensen | |
| 4,695,387 A | 9/1987 | Berry | |
| 5,205,237 A | 4/1993 | Skeggs | |
| 5,512,182 A | 4/1996 | Sheikh | |
| 6,083,377 A | 7/2000 | Lin | |
| 6,432,312 B1 | 8/2002 | Fuss | |
| 7,736,776 B1 | 6/2010 | Spielman | |
| 2001/0004962 A1* | 6/2001 | Hirota ................. | C02F 1/46104 204/228.1 |
| 2002/0189935 A1 | 12/2002 | Shelp | |
| 2003/0052062 A1 | 3/2003 | Iseki | |
| 2003/0173300 A1 | 9/2003 | Bradley | |
| 2003/0226766 A1* | 12/2003 | Orlebeke ............... | A01K 63/04 205/688 |
| 2004/0035716 A1 | 2/2004 | Ikegami | |
| 2004/0134796 A1* | 7/2004 | Shelp .................... | B01J 49/0008 205/755 |
| 2004/0232088 A1* | 11/2004 | Stenmark ................. | B01J 3/008 210/758 |
| 2004/0251212 A1 | 12/2004 | Ikematsu | |
| 2004/0256317 A1 | 12/2004 | Yamada | |
| 2005/0127323 A1* | 6/2005 | Tyler ...................... | A01K 63/04 252/176 |
| 2005/0211569 A1 | 9/2005 | Botte | |
| 2007/0023359 A1 | 2/2007 | Grott | |
| 2007/0039893 A1 | 2/2007 | Kemp | |
| 2007/0163952 A1 | 7/2007 | Schreier | |
| 2008/0011679 A1* | 1/2008 | Champagne ....... | B01D 19/0036 210/637 |
| 2008/0023407 A1* | 1/2008 | Eriksson .................. | C02F 1/24 210/702 |
| 2008/0277289 A1 | 11/2008 | Seed | |
| 2009/0314711 A1 | 12/2009 | Barry | |
| 2009/0317308 A1 | 12/2009 | Ren | |

FOREIGN PATENT DOCUMENTS

| | | | | |
|---|---|---|---|---|
| EP | 0659692 A1 | 6/1995 | | |
| EP | 0956767 A1 * | 11/1999 | ........... | A01G 31/001 |
| GB | 2332210 A | 6/1999 | | |
| JP | 5115870 A2 | 5/1993 | | |
| JP | 6182325 A2 | 7/1994 | | |
| JP | 6182326 A2 | 7/1994 | | |
| JP | 2001/104957 A2 | 4/2001 | | |
| JP | 2001/353489 A2 | 12/2001 | | |
| JP | 2002/010724 A2 | 1/2002 | | |
| JP | 2002/045847 A2 | 2/2002 | | |
| JP | 2003/023917 A2 | 1/2003 | | |
| JP | 2003/284453 A2 | 10/2003 | | |
| JP | 2006/043663 A2 | 2/2006 | | |
| KR | 2007/0113494 A | 11/2007 | | |
| WO | 99/40990 A1 | 8/1999 | | |
| WO | 02/082895 A1 | 10/2002 | | |
| WO | 2005/075355 A2 | 8/2005 | | |
| WO | 2008/061975 A2 | 5/2008 | | |
| WO | 2011/157812 A1 | 12/2011 | | |

OTHER PUBLICATIONS

Cripps and Bergheim "Solids management and removal for intensive land-based aquaculture production systems" Aquacultural Engineering 22(1-2): 33-56 (2000.
Diaz et al., "Kinetics of electro-oxidation of ammonia-N, nitrites and COD from a recirculating aquaculture saline water system using BDD anodes" Water Res 45(1): 125-134 (2011).
Dryden and Weatherley "Aquaculture water treatment by ion-exchange: I. Capacity of hector clinoptilolite at 0•01-0•05 n" Aquacultural Engineering 6(1): 39-50 (1987).
Dryden and Weatherley "Aquaculture water treatment by ion-exchange: II. Selectivity Studies with Clinoptilolite at 0.01 N" Aquacultural Engineering 6(1): 51-68 (1987).
Dryden and Weatherley "Aquaculture water treatment by ion-exchange: Continuous Ammonium Ion Removal with Clinoptilolite" Aquacultural Engineering 8: 109-126 (1989).
Johnson and Sieburth "Ammonia removal by selective ion exchange. A backup system for microbiological filters in closed-system aquaculture" Aquaculture 4: 61-68 (1974).
Kropp et al., "A device that converts aqueous ammonia into nitrogen gas" Aquacultural Engineering 41: 28-34 (2009).
Lee et al., "Residual chlorine distribution and disinfection during electrochemical removal of dilute ammonia from an aqueous solution" Journal of Chemical Engineering of Japan 35(3): 285-289 (2002).
Lei et al., "Electrochemical regeneration of zeolites and removal of ammonia" J Hazard Mater 169(1-3): 746-750 (2009).
Li et al., "Application of an electrochemical-ion exchange reactor for ammonia removal" Electrochimica Acta 55: 159-164 (2009).
Li et al., "Simultaneous regeneration of zeolites and removal of ammonia using an electrochemical method" Microporous Mesoporous Mater 127: 161-166 (2010).
Lin and Wu "Electrochemical removal of nitrite and ammonia for aquaculture" Wat Res 30(3): 715-721 (1996).
Lin and Wu "Electrochemical nitrite and ammonia oxidation in seawater" Journal of Environmental Science and Health Part A—Environmental Science and Engineering & Toxic and Hazardous Substances Control. 32(8): 2125-2138 (1997).
Seed et al., "A novel ion-exchange/electrochemical technology for the treatment of ammonia in wastewater" (www.enpar-tech.com/documents/AmmEL_WEAO_2003.pdf) (2003).
Van Rijn et al. "Denitrification in recirculating systems: Theory and applications" Aquacultural Engineering 34(3): 364-376 (2006).

* cited by examiner

PHYSICO-CHEMICAL PROCESS FOR REMOVAL OF NITROGEN SPECIES FROM RECIRCULATED AQUACULTURE SYSTEMS

FIELD OF THE INVENTION

The present invention relates to physico-chemical processes for the continuous removal of nitrogen and optionally phosphorous species from recirculated aquaculture systems (RAS), including fresh water and saline (or seawater) RAS.

BACKGROUND OF THE INVENTION

Aquaculture, also known as the farming of aquatic organisms, provides nearly one third of all seafood consumed in the world at present. It constitutes an alternative to fishing and is expected to expand with the increase of consumers' demand for seafood and the decrease in wild supplies (Timmons, Ebeling, Wheaton, Summerfelt, and Vinci, 2002, Recirculating Aquaculture Systems, $2^{nd}$ Edition, 760, Cayuga Aqua Ventures, Ithaca, N.Y.).

Aquaculture systems can be extensive, semi-extensive, or intensive, depending on the number of organisms grown per volume of water. An exemplary extensive aquaculture system is a pond culture. Cage culture is considered semi-intensive outside the cage and intensive inside the cage. The main disadvantage associated with these aquaculture systems is their high water consumption (typically 3-5 $m^3$ per kg fish produced). These systems also tend to be environmentally unfriendly.

Recirculated Aquaculture Systems (RAS) are intensive aquaculture systems which were developed and refined over the past thirty years. These systems provide a controlled environment in which fish grow. Consequently, fish can be stocked at high to very high densities, depending on the fish species. In these systems fish are raised in tanks, sometimes within closed buildings, while water is recycled throughout the system and various treatment units enable maintenance of adequate water quality. In this manner only a small percentage of the water is exchanged daily. Failure of any one of the treatment units can cause the entire system to fail, usually killing the fish population. RAS have relatively low water consumption and thus can be built at favorable locations, with less dependency on the water source. RAS further provide year-round production, mitigation of environmental risks (e.g. diseases) and pollution. RAS are species-adaptable, allowing operators to follow market trends for seafood preference. Moreover, RAS constitute a "point source" of pollution, which enable efficient solids waste treatment and nutrient removal and are thus considered environmentally friendly.

The high fish densities in RAS require efficient gas-transfer systems which dissolve oxygen and remove carbon dioxide from the culture water. Additionally, nonionized ammonia ($NH_3$) is toxic to many fish species at concentrations as low as 0.0125 mg $NH_3$—N $L^{-1}$. In order to avoid the accumulation of ammonia, a nitrification unit is employed to reduce the total ammonia nitrogen (TAN) to concentrations typically below 3 mg $L^{-1}$ (warm-water fish; Timmons et al., 2002). One equivalent of alkalinity is generated for each equivalent of ammonia ($NH_3$) excreted by the fish gills when converted to the ammonium ion ($NH_4^+$) at pH close to neutral, at which the pond is typically operated. Nitrification consumes approximately two equivalents of alkalinity per mole of oxidized ammonium. Thus, in RAS with a nitrification unit, only one equivalent of alkalinity is lost per mole nitrogen excreted by the fish. In high-density cultures, this alkalinity loss can lead to the elimination of the water buffer capacity, which may result in a pH drop, which in turn hinders nitrification, causes ammonia to accumulate, and may finally result in fish death. In order to avoid this scenario, a strong base such as sodium hydroxide (NaOH) or a weak base such as sodium bicarbonate ($NaHCO_3$) is usually added to the system. Alternatively, the make-up water flow rate can be increased or the effluents of a denitrification reactor can be recycled back into the pond.

Treatment of aquaculture farm effluents can amount to 2%-10% of the total production costs (Cripps and Bergheim, 2000, Aquacultural Engineering, 22, 33-56) which is a major disadvantage as compared to the less sophisticated aquaculture facilities, such as earthen ponds and fish cages. Profitability of recirculating systems depends in part on the ability to manage nutrient wastes (Van Rijn, Tal and Schreier, 2006, Aquacultural Engineering 34, 364-376).

Currently, most RAS configurations do not include a nitrate removal unit, and hence nitrate concentration in the effluents is set only by the make-up water exchange rate. Intensive nitrate removal is feasible only if a denitrification reactor is employed (e.g. in zero discharge systems). Typically, only ammonia (which is immediately toxic to the fish) is removed, while nitrate and dissolved phosphorus species (which constitute an environmental problem but are not considered toxic at reasonable concentrations) accumulate in the water and are disposed of with the discharge from the pond. The removal of all the nutrients is employed in several RAS technologies by applying a closed loop nitrification-denitrification sequence. The removal of phosphorous species is usually performed by the addition of chemicals. The conventional technique for N species removal consists of biological ammonia removal by nitrifying bacteria. However, nitrifying bacteria are autotrophic organisms with a long doubling time and low biomass yield. Therefore, these systems suffer from long start-up periods and when failure occurs, the recovery of the bacterial population is slow. Moreover, when a denitrification system is employed and its effluent is recycled back into the system, turbidity may develop in the pond which increases the potential for the outbreak of disease. The reduction of make-up water and the recycle of the water through the denitrification reactor have also been associated with the development of off-flavor in the fish.

US 2003/0052062 discloses a nitrogen treating method wherein a nitrogen compound in for-treatment water is treated according to an electrochemical technique with hypohalogenous acid, or ozone or active oxygen.

US 2009/0317308 discloses catalysts for converting ammonia in an aqueous solution directly to nitrogen gas at about or above ambient temperature.

US 2009/0317308 further provides a method for water treatment to lower its ammonia content by converting the ammonia to nitrogen directly in aqueous phase.

U.S. Pat. No. 4,522,727 discloses a continuous process for removal of ammoniacal nitrogen from water with a particulate zeolitic ion exchange material that is continuously regenerated by heating in the presence of an oxygen-containing gas.

U.S. Pat. No. 5,512,182 discloses a method for removing trace amounts of ammonia and ammonia-containing compounds from process water involving the destruction of the ammonia by oxidative procedures.

US 2004/0134796 discloses an apparatus for diminishing the concentration of ammonium in wastewater, and for disposing of the ammonium as nitrogen gas, the apparatus includes an ammonium-extraction-and-transfer station which is operable to transfer the ammonium extracted from the stream of wastewater into solution, and an electrolysis station to electrolyze the secondary-water and to oxidize the ammonium dissolved therein to nitrogen gas. The apparatus further includes a nitrogen-discharge port, for discharging the resulting nitrogen gas from the electrolysis station.

Seed et al. (www.enpar-tech.com/documents/AmmEL_WEAO_2003.pdf) discloses an ion-exchange/electrochemical technology to treat ammonia in wastewater streams which uses electrochemistry to convert ammonia to nitrogen gas.

There is an unmet need for economical and reliable technique for removal of nitrogen and phosphorus species which are excreted by the fish in a recirculated aquaculture system without the use of hazardous chemicals.

SUMMARY OF THE INVENTION

The present invention provides processes for removing nitrogen as well as phosphorus species from a recirculated aquaculture system (RAS) containing either fresh water or high salinity water. The processes are conveniently performed at ambient temperatures and at low pH values at which the concentration of $NH_3$ is lower than a value considered detrimental for the growth or survival of the aquaculture species such as fish or shrimp. In one embodiment, the RAS is a fresh water system, for example fish ponds or pools. In another embodiment, the RAS is a saline water system, for example seawater.

The present invention is based in part on the realization that it is possible to maintain the total ammonia nitrogen (TAN) concentration between 15 and 50 mgN/L in the absence of biological reactors, if the pH is properly controlled. In one particular embodiment, the processes of the present invention are performed while controlling the pH levels at less than 7.5 and above 6.0 so as to afford relatively high total ammonia nitrogen (TAN=$[NH_4^+]+[NH_3]$) concentrations (about 15-50 mg/L). For any given TAN concentration, the pH in the pond is maintained at a value at which the associated $NH_3$ concentration is lower than the value considered detrimental for the growth of fish/shrimp species. Under these conditions, the removal of the detrimental $NH_4^-$ species can be performed with high reliability and without generating any waste streams by means of electrochemical treatment optionally preceded by ion-exchange treatment when fresh water systems are involved. The processes do not require start up periods, are not susceptible to toxins, and are cost-effective.

According to a first aspect, the present invention provides a process for removing nitrogen species from a fresh water recirculated aquaculture system (RAS) so as to maintain the total ammonia nitrogen (TAN) concentration in the water in said system no higher than 50 mg N/L.

Thus, the present invention provides a process for maintaining the total ammonia nitrogen (TAN) in a fresh water recirculated aquaculture system (RAS) for growing fish or shrimp comprising the steps of:

a. maintaining the pH of the water in the RAS below pH 7.5;

b. extracting a portion of the water from the RAS;

c. passing the portion of the water from the RAS through an ion-exchange resin so as to remove $NH_4^+$ ions;

d. regenerating the $NH_4^+$ enriched ion-exchange resin obtained in step (c) using a solution comprising high concentrations of exchange cation and chloride as the counter anion at concentrations higher than 50 gCl/L; and e. converting $NH_4^+$ ions accumulated in the brine obtained during step (d) to gaseous nitrogen ($N_2$) by electrochemically generating active chlorine species capable of ammonia-to-nitrogen gas oxidation.

It will be recognized by one of skill in the art that the electrochemical process generates active chlorine species at the anode from chloride ions present in the brine.

In some embodiments, the exchange cation in the step of regenerating the resin is selected from the group consisting of $Ca^{2+}$, $Mg^{2+}$, $Na^+$, and $K^+$. Each possibility represents a separate embodiment of the present invention. In one embodiment, the exchange cation in the step of regenerating the resin is $Ca^{2+}$.

Optionally, this process can be conducted in a continuous manner wherein steps (a) to (e) are repeated as necessary and at the desired frequency.

In one embodiment, the pH of the RAS water is maintained below pH 7.5 so as to not exceed the detrimental $NH_{3(aq)}$ concentration. In another embodiment, the process for removing nitrogen species from fresh water RAS further comprises the step of recycling the water obtained after ion-exchange (i.e., step c) back to the RAS.

In some embodiments, the process for removing nitrogen species from fresh water RAS further comprises the advantageous removal of phosphorus species by precipitation of the phosphorus species with the calcium ions released into the water after the ion exchange step (c) when recycling the water back to the RAS. In other embodiments, the phosphorous species are removed by the addition of calcium ions directly to the RAS to induce precipitation of calcium-phosphate salts. The calcium-phosphate solids can be collected by any manner known in the art, for example using an intrinsic solid filter or a separation unit.

In some embodiments, steps (a)-(e) of the process for removing nitrogen species from fresh water RAS are performed continuously.

In alternative embodiments, steps (a)-(c) of the process for removing nitrogen species from fresh water RAS are performed continuously and steps (d-e) are performed during low cost electricity hours. For example the electrochemical step may be performed between 11 PM and 5 AM, or any other times at which the cost of electricity is at its lowest.

In further embodiments, the ion exchange resin is selected from a zeolite and a polymeric cation exchange resin. Each possibility represents a separate embodiment of the present invention.

According to a second aspect, the present invention provides a process for removing $NH_4^+$ from high saline water recirculated aquaculture system (RAS) so as to maintain the total ammonia nitrogen (TAN) concentration in the water in said system no higher than 50 mg N/L.

Thus, the present invention provides a process for maintaining the total ammonia nitrogen (TAN) in a high salinity water recirculated aquaculture system (RAS) comprising the steps of:

a. maintaining the pH of the water in the RAS below pH 7.5;

b. extracting a portion of the water from the RAS; and c. oxidizing the ammonia in the portion of the water to nitrogen gas by electrochemical treatment or by breakpoint chlorination in the presence of a solution comprising $Cl^-$ ions at concentrations higher than 50 g/L.

Optionally, this process can be conducted in a continuous manner wherein steps (a-c) are repeated as necessary and at the desired frequency. In some embodiments, step (b) of the process for removing nitrogen species from a saline water RAS is performed continuously and step (c) is performed during low cost electricity hours. For example the electrochemical treatment may be performed between 11 PM and 5 AM, or any other times at which the cost of electricity is at its lowest.

In one embodiment, the pH of the RAS is kept below 7.5.

In some embodiments, the process for removing nitrogen species from a saline water RAS further comprises the step of recycling at least some portion of the water back to the RAS.

In additional embodiments, ammonia removal is effected by electrooxidation of seawater, preferably performed during low cost electricity hours.

In certain embodiments, the pH of the RAS is maintained below 7.5 by addition of a strong acid.

In various embodiments, the acid is $H_2SO_4$. In other embodiments, the acid is HCl.

In further embodiments, a base is added to the electrolysis tank. In particular embodiments the base is selected from $Ca(OH)_2$, CaO, NaOH and KOH. Each possibility represents a separate embodiment of the present invention. In one embodiment, the base is $Ca(OH)_2$.

In additional embodiments, the pH of the RAS is further maintained by stripping of $CO_2$, wherein stripping of $CO_2$ comprises the addition of pure oxygen or aeration.

In some embodiments, the portion of the water treated comprises up to 100% of the RAS water volume. In other embodiments, the portion of the water treated comprises between 0% and 60% of the RAS water volume. In some typical embodiments, the portion of the water treated comprises up to 25% of the RAS water volume. In certain embodiments, the pond is operated as a "closed" system, i.e. with no water addition apart from compensation for natural evaporation.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The present invention provides processes of RAS nitrogen and optionally phosphorous species removal for fresh water fed RAS and for RAS fed with high salinity water (seawater, brine). The processes comprise the electrochemical oxidation of ammonia and precipitation of phosphorous salts optionally preceded by ammonia adsorption and $Ca^{1+}$ release by an ion exchange step. These processes are preferably performed while maintaining pH lower than 7.5.

The control of pH levels to less than 7.5 provides $NH_3$ concentrations which are lower than a value considered detrimental for the growth of fish species. The TAN concentration in the RAS is maintained at a predetermined constant concentration either by passing the water through an ion exchange step in which $NH_4^+$ is adsorbed and a cation such as $Ca^{2+}$ is released to the water (fresh water RAS), or by maintaining an appropriate inlet and treated water recirculation flow rates. This technique obviates the need for nitrifying bacteria as well as denitrification reactors, thus overcoming the problems of the prior art. For fresh water RAS the process comprises a continuous $NH_4^+$ cation exchange step, followed by chemical regeneration of the ion exchange resin by brine solution and electrochemical treatment of the formed ammonia-rich brine. For high salinity water (seawater, brines) the process comprises ammonia electrooxidation either by collecting a portion of the water and performing electrochemical treatment in which the ammonia is oxidized to $N_{2(g)}$, or by allowing the water to continuously flow followed by the addition of a seawater solution which contains a high $Cl_2$ concentration which results in the oxidation of $NH_4^+$ to $N_2$ by a process known as breakpoint chlorination. The $Cl_2$-rich seawater solution can be formed from electrooxidation of seawater, preferably performed during low cost electricity hours.

For a better understanding of the invention and to show how it may be carried into effect, reference will now be made, purely by way of example, to the accompanying drawings. With specific reference now to the drawings in detail, it is stressed that the particulars shown are by way of example and for purposes of illustrative discussion of the preferred embodiments of the present invention only, and are presented with the purpose of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice.

Figure 1:
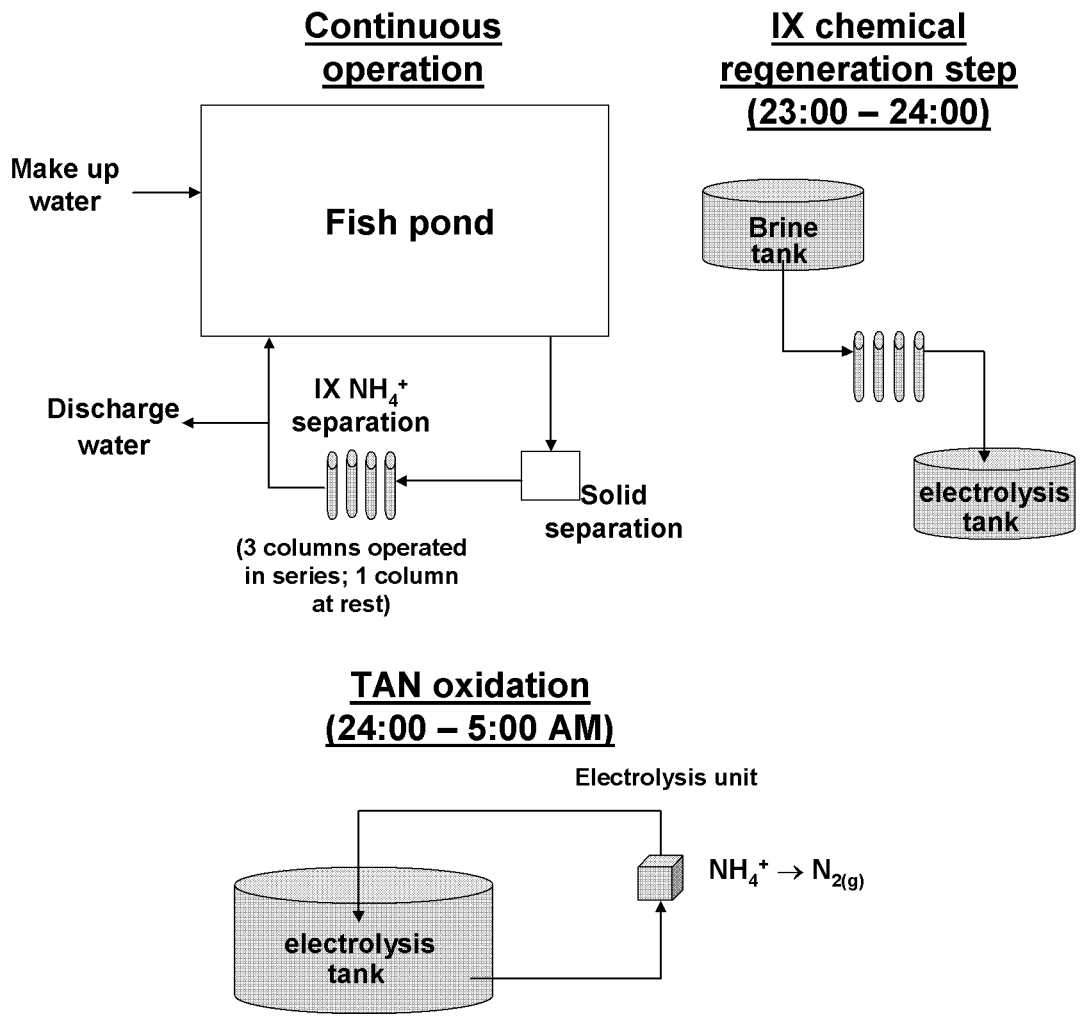
FIG. 1 is a schematic representation of the process of the present invention (freshwater RAS).

FIG. 1 depicts an exemplary system which demonstrates the process for the removal of nitrogen and phosphorous species from fresh water RAS through ion exchange resin followed by chemical regeneration and electrochemical oxidation of the ammonia released to the brine. This process comprises the extraction of a portion of the water from the RAS and passing it through an ion-exchange resin so as to remove $NH_4^+$ ions. The $NH_4^+$ enriched ion-exchange resin can then be regenerated using a solution comprising high concentrations of exchange cation and chloride as the counter anion at concentrations higher than 50 gCl/L. The $NH_4^+$ ions which accumulate in the brine can be converted to gaseous nitrogen ($N_2$) by electrochemically generating active chlorine species capable of ammonia-to-nitrogen gas oxidation. Make up and discharge water may amount to anything from mere compensation for evaporation (i.e. zero discharge) up to conventional RAS freshwater exchange rates (0.3-1.0 m$^3$/kg fish produced). The fish rearing unit is maintained at a pH value close to pH 7.0. In an exemplary embodiment, the pH value is below 7.5. In a particular embodiment, the pH value is maintained between 6.5 and 7.5. Assuming (for example) that the limiting $NH_{3(aq)}$ concentration for the fish is 0.1 mg/L (a reasonable assumption for many fresh water fish), the total TAN concentration in the pond can be maintained at 30 mgN/L if the pond is maintained at ~pH 6.8 and 15 mgN/L if the pond is maintained at ~pH 7.15. In principle, when the TAN concentration is 15 mg/L the required pH in freshwater is around 7.0 and when TAN is 50 mg/L the required pH in freshwater is around pH 6.3. The required pH to maintain the TAN concentration depends on the salinity of the water due to different activity coefficients and on the type of fish cultivated as different fish are sensitive to different $NH_3$ concentrations.

Control of the pH value in the rearing unit can be performed by the addition of a strong acid or/and by controlling the $CO_{2(g)}$ stripping rate. Suitable strong acids include, but are not limited to, $H_2SO_4$ and HCl. Currently preferred is the use of $H_2SO_4$. For controlling the $CO_{2(g)}$ stripping rate, oxygen can be supplied to the fish in its pure form. Additional methods for controlling the $CO_{2(g)}$ stripping rate include, but are not limited to, aeration. Possible formation of calcium carbonate solids can also reduce the alkalinity concentration in the pond and, consequently, the requirement for strong acid addition.

High ammonium ion concentrations along with low water replacement rate can promote the growth of nitrifying bacteria in RAS water, potentially leading to unwanted nitrite ($NO_2^-$) and nitrate ($NO_3^-$) formation. Apart from the fact that the treatment system is not designed to remove either species, nitrite is also poisonous to fish cultures at concentrations as low as 0.1 mgN/L. In order to hinder the development of nitrifying bacteria, appropriate inhibitors, such as N-allylthiourea or other bacterial growth inhibitors can be added to the RAS water at concentrations sufficient for inhibiting bacterial growth but at the same time harmless to the fish.

According to the principles of the invention, under normal operation conditions, $NH_4^+$ is removed from the fish pond water by passing the water through one or more ion exchange columns The resins that can be used in such columns comprise cationic exchange systems including, but not limited to, zeolite (either naturally occurring e.g. climoptilolite or synthetic zeolites), polymeric resins (e.g. Dowex, Purolite) and other systems known in the art. When the column(s) is exhausted (e.g. when the average $NH_4^+$ concentration at the outlet reaches about 2 mgN/L or another predetermined value) the recycled flow is switched to another column and the exhausted column(s) comes to rest until it is regenerated, preferably during low-cost electricity hours. The recirculated flow rate depends on the specific $NH_4^+$ breakthrough curve and the designated TAN concentration in the pond (which depends on pH, the type of fish grown etc.). For example, during a 24 hour cycle, three columns (out of 4) are exhausted. The 4$^{th}$ column comes into operation during the regeneration period of the three exhausted columns which is preferably conducted during low-cost electricity hours. Any other configuration, which ensures that at all times at least one column is available for $NH_4^+$ adsorption, can be used.

The regeneration of the exhausted column can be performed as is well known in the art. Exemplary regenerations include treatment with concentrated brine solutions with various cationic compositions. Typical brine solutions include a relatively high Cl$^-$ concentration (>30 gCl$^-$/L). The effluent of the chemical regeneration, i.e. the $NH_4^+$ containing brine, flows to a second holding container from where it is recycled through an electrolysis unit. During this step pH in the brine solution is maintained in the range of about 4-5 in order to prevent precipitation (of Ca containing compounds) on the cathode. Currently preferred is pH value of about 4. To prevent pH from dropping below pH 4, a strong base may be added. Additionally, calcium carbonate precipitates formed in the pond water can be separated and transferred into the brine solution to increase its pH, return $Ca^{2+}$ ions into the brine, and release $CO_2$ from the system. The high Cl$^-$ concentration allows for efficient Cl$^-$ oxidation on the anode and the $Cl_2$ that is formed reacts with $NH_4^+$ to yield $N_{2(g)}$. The main cathodic reaction is $H_{2(g)}$ evolution, which can be collected to decrease the operational costs.

The electrolysis step is preferably performed during low cost electricity hours. The $NH_4^+$ oxidation can be performed in efficiency as high as 100% when the Cl$^-$ concentration is 50 g/L or above.

The chemical reactions on the anode, cathode and aqueous phase during the electrolysis step are:

Reaction on the anode:

$$2Cl^- \rightarrow Cl_2 + 2e^- \qquad (1)$$

Reaction on the cathode:

$$2H^+ + 2e^- \rightarrow H_2 \qquad (2)$$

Possible reactions in the aqueous phase (based on stoichiometry):

$$Cl_2 + H_2O \rightarrow HOCl + H^+ + Cl^- \qquad (3)$$

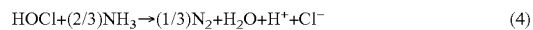
$$HOCl + (2/3)NH_3 \rightarrow (1/3)N_2 + H_2O + H^+ + Cl^- \qquad (4)$$

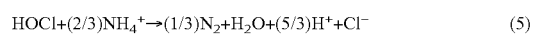
$$HOCl + (2/3)NH_4^+ \rightarrow (1/3)N_2 + H_2O + (5/3)H^+ + Cl^- \qquad (5)$$

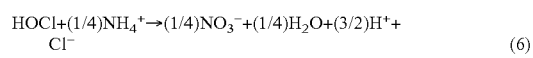
$$HOCl + (1/4)NH_4^+ \rightarrow (1/4)NO_3^- + (1/4)H_2O + (3/2)H^+ + Cl^- \qquad (6)$$

In order to prevent pH drop in the regeneration solution, a strong base may be added. Suitable strong bases include, but are not limited to, $Ca(OH)_2$, CaO, NaOH, KOH and the like. The addition of CaO or $Ca(OH)_2$ can further be used for the precipitation of phosphorous species as e.g. $Ca_3(PO_4)_2$ or $Ca_5(PO_4)_3(OH)$. Further $Ca^{2+}$ can precipitate as $CaCO_3$, thus reducing the overall inorganic carbon concentration in the water and consequently the $CO_{2(aq)}$ concentration. The exact cation composition of the regeneration solution is a function of the alkalinity-compensating chemical used (e.g. CaO), the cation composition of the pond water and the cation affinity sequence of the resin that is used. Thus, the regeneration solution may comprise ions including, but not limited to, $Ca^{2+}$, $Na^+$, $K^+$, and $Mg^{2+}$. Each possibility represents a separate embodiment of the invention. In some embodiments, the overall ionic strength of the regeneration solution as well as the Cl$^-$ concentration is substantially constant.

Figure 2:
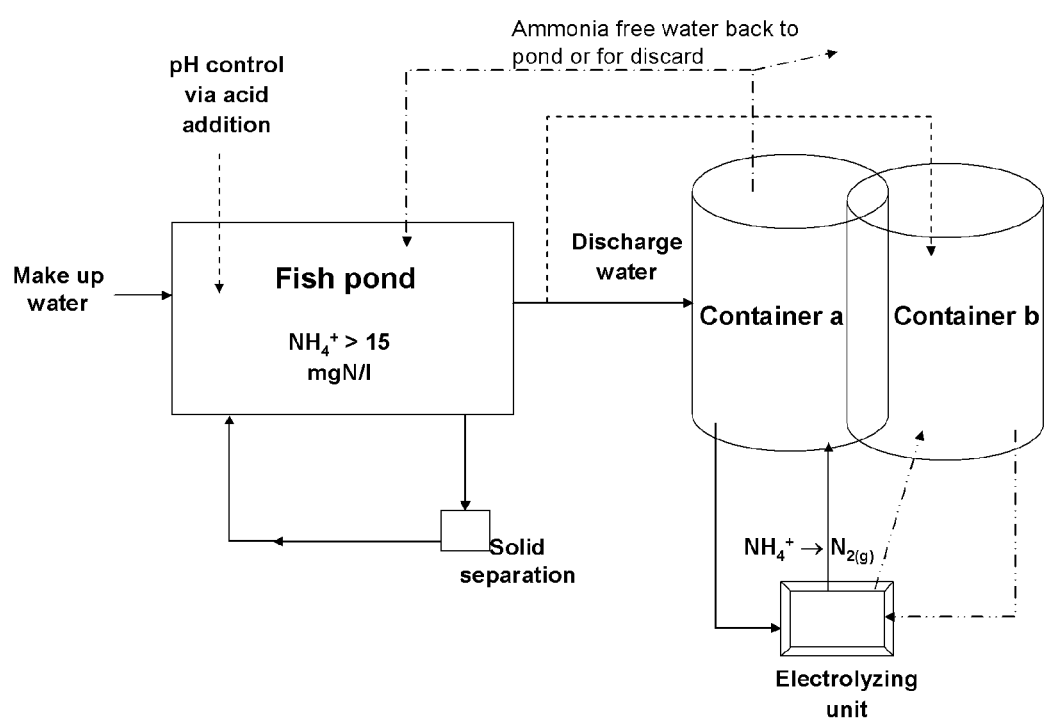
FIG. 2 is a schematic representation of the electrochemical ammonia oxidation of the present invention in high salinity water (Option 1).
Figure 3:
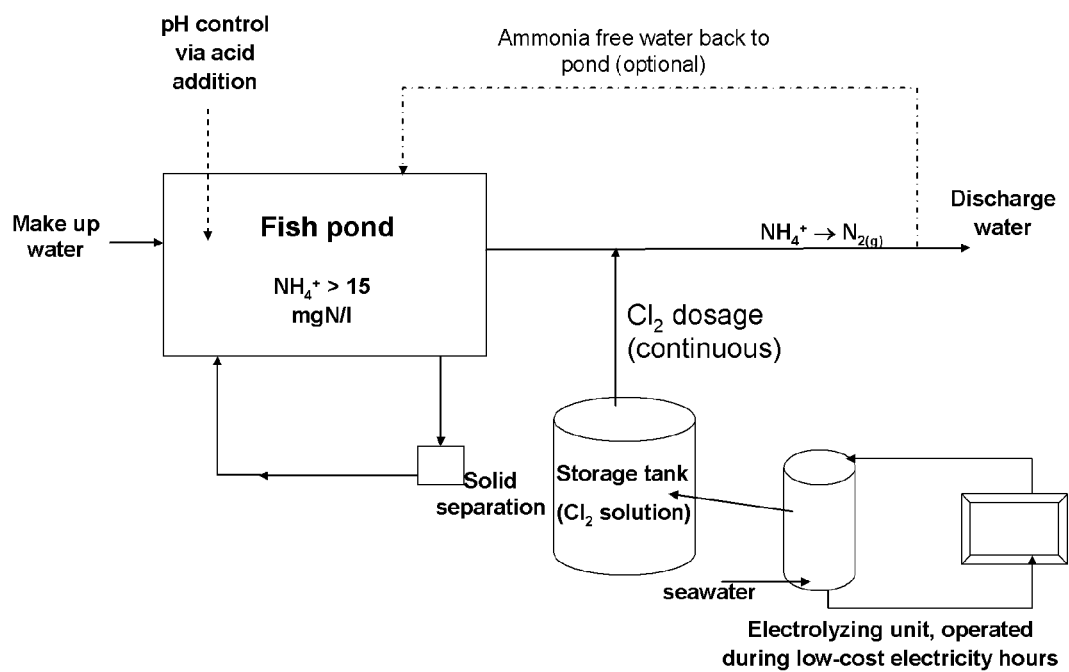
FIG. 3 is a schematic representation of the electrochemical ammonia oxidation of the present invention in high salinity water (Option 2).

FIGS. 2 and 3 depict exemplary systems which demonstrate the process for the removal of ammonia from RAS fed with high salinity water (e.g., seawater, brine). Due to the presence of high Cl$^-$ concentrations, electro-oxidation and $Cl_2$ formation efficacy is high, and there is no need for a dedicated brine solution. This process comprises the extraction of a portion of the water from the RAS and the subsequent oxidation of the ammonia in the portion of the water to nitrogen gas by electrochemical treatment or by breakpoint chlorination in the presence of a solution comprising $Cl^-$ ions at concentrations higher than 50 g/L. Two options are suggested as exemplary embodiments for the $NH_4^+$ electro-oxidation:

Option 1 (exemplified in FIG. 2): In accordance with this option, fresh seawater and water following the ammonia removal treatment is supplied to a fish/shrimp rearing system at a rate which results in $NH_4^+$ concentration of between 15 and 50 mgN/L. The water which flows out of the fish growth system is collected in a dedicated container/pond. At least two such containers are operated. During low-cost electricity hours, the water in one container is recycled through an electrolyzer and the ammonia is electro-oxidized to $N_{2(g)}$. During the electrolysis, the pH value is maintained constant at about 6.0-6.5. This can be performed by the addition of a strong base as is known in the art. Suitable strong bases include, but are not limited to, $Ca(OH)_2$, CaO, NaOH, KOH and the like. If P removal is desired, phosphate may be precipitated from the water by conventional P precipitation treatment using salts. Suitable salts include, but are not limited to, ferric- or calcium-salts. The treated water may be returned to the fish rearing ponds (reducing pumping costs and TAN concentration) or discarded.

Option 2 (exemplified in FIG. 3): In accordance with this option, the water flowing out of the pond is not collected and no water storage is required. During low cost electricity hours, seawater is electrolyzed to result in a solution which is rich in $Cl_{2(aq)}$. This high chlorine solution is continuously dosed at the required $Cl_2:NH_4^+$ molar ratio (typically about ≥1.5) to the ammonia rich water, and ammonia is oxidized to $N_{2(g)}$ via a process known as "breakpoint chlorination". The term "breakpoint chlorination" as used herein refers to oxidation of ammonia via the external dosage of a $Cl_2$ chemical at a molar ratio typically equal to or higher than 1.5 ($Cl_2$) to 1 (N).

The principles of the invention are demonstrated by means of the following non-limiting examples.

EXAMPLE 1

Batch Ammonia Electrooxidation

Figure 4:
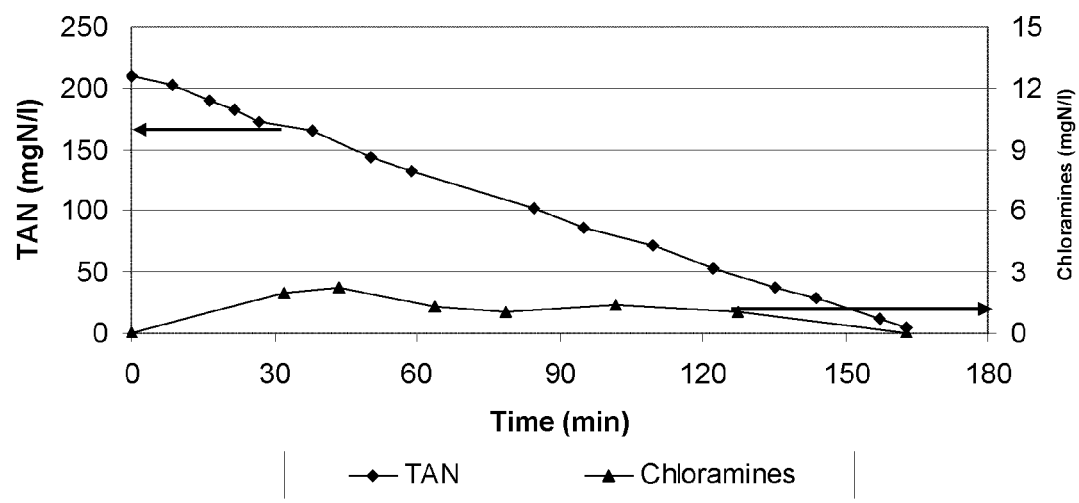
FIG. 4 TAN (♦) and chloramines (▲) vs. time in a batch ammonia electrochemical oxidation experiment.

Several experiments were performed with various $NH_4^+$ concentrations and pH values. The results of two representative experiments are presented in FIGS. 4 and 5.

In all the experiments that were conducted at low pH (results shown in FIG. 4) or in water with low buffering capacity in the regenerant solution, the TAN concentration dropped in a linear fashion with time and hardly any chloramine species were formed. The results depicted in FIG. 4 were obtained with the following conditions: pH 4.5 (maintained constant by controlled addition of NaOH 1.5 M), I=4.5 amp, electrolyte volume 10 liter, $[NH_4^+]_0$=209.2 mgN/L, applied voltage 4.412 V, electrodes surface area 9.1*5.1 $cm^2$ (Ti/$RuO_2$ anode, Ti cathode). The $Cl^-$ concentration was 80 g/L. Under such high CF concentration the current efficiency, defined as the fraction of electrons utilized for the desired reaction (i.e. ammonia oxidation by $Cl_2$), approached 100% (observed efficacy=97%).

Figure 5:
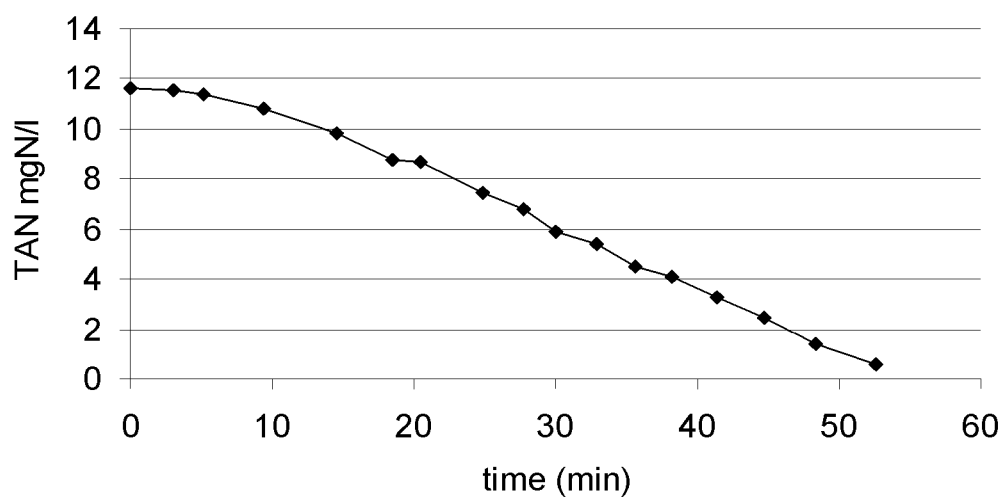
FIG. 5 TAN vs. time in a batch ammonia electrochemical oxidation experiment.

FIG. 5 shows a representative result from an experiment performed in a fish pond fed with water from the Red Sea (Eilat, Israel) to which ammonia was externally added to attain $[TAN]_0$=11.7 mgN/L. The results depicted in FIG. 5 were obtained with the following conditions: $pH_0$=7.23 (maintained constant by controlled addition of NaOH 1.5 M), I=1.0 amp, electrolyte volume 10 liter, $[NH_4^+]_0$=11.7 mgN/L, applied voltage 3.46 V, electrodes surface area 9.1*5.1 $cm^2$ (Ti/$RuO_2$ anode, Ti cathode). The overall recorded current efficiency in this experiment was 76%. Without being bound by any theory or mechanism of action, the recorded efficacy may be due to high suspended solids (organic matter) concentration in the pond water, which was also oxidized by the $Cl_2$ released from the anode. Current efficiency obtained in a similar ammonia electrooxidation experiment performed with raw seawater approached 100%.

Thus, the current efficiency in seawater ammonia electrooxidation can reach 100% by pre-separating the suspended solids from the pond water.

EXAMPLE 2

$NH_4^+$ Removal From Fish Pond Water (Fresh Water RAS) by Ion Exchange

In order to establish the relevant breakthrough curves, water from an active RAS (Sdey Trumot, Israel) were used and compared with a breakthrough curve obtained with tap water. The experiments were performed as follows: $NH_4Cl$ was added to the water to attain TAN concentrations of either 15 or 30 mgN/L. In all experiments the pH was adjusted so as to provide $NH_{3(aq)}$ concentration of 0.1 mgN/L.

Figure 6:
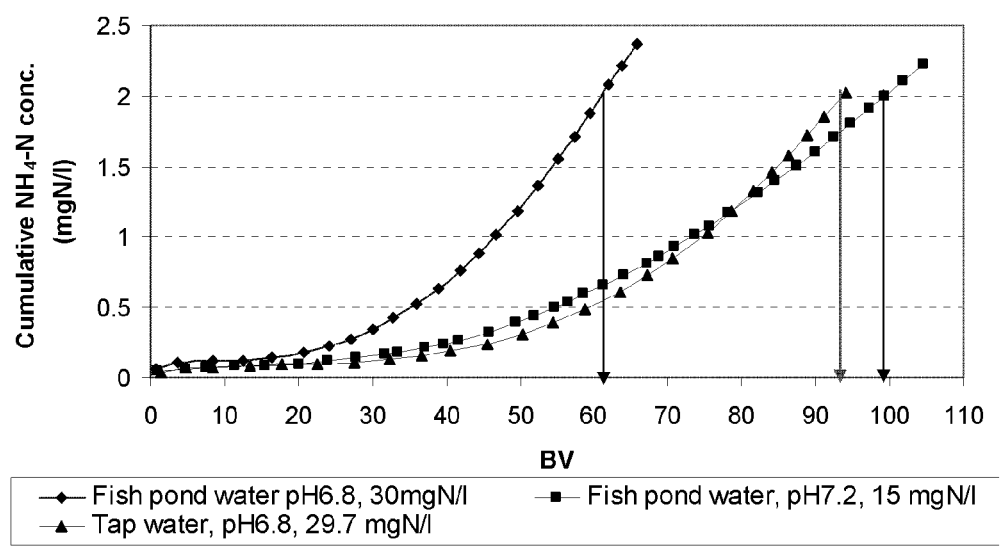
FIG. 6 Ion exchange breakthrough curves.

FIG. 6 shows ion exchange breakthrough curves (Fish pond water: $[Ca^{2+}]$=112; $[Mg^{2+}]$=51.7; $[Na^+]$=194.4; Tap water $[Ca^{2+}]$=82.6; $[Mg^{2+}]$=36.2; $[Na^+]$=101.8; $[K^+]$=4.9 (all concentrations in mg/L). The breakthrough curve obtained with fish pond water (15 mg/L, pH 7.2, 100 bed volumes (BV) to attain 2 mgN/L of ammonia) was used in the following case study calculations.

EXAMPLE 3

RAS Simulation

In order to verify the feasibility of the ammonia treatment according to the principles of the present invention, a mathematical model simulating a fish growing RAS was developed using the Matlab™ software. Model input parameters are listed in Table 1.

TABLE 1

Parameters that were used for water quality simulation in fresh and seawater RAS operation

| Parameter | Value |
|---|---|
| Aquaculture volume | 100 $m^3$ |
| Fish density | 50 kg/$m^3$ |
| Feeding rate | 100 kg/d (40% protein) |
| Fish type | Tilapia for fresh water |
| | Seabream for seawater |
| $NH_3$ excreted by fish per kg feed | 45 g for Tilapia |
| | 40 g for Seabream |
| $CO_2$ excreted by fish per kg feed | 1375 g for Tilapia |
| | 748 g for Seabream |
| Make up water flow rate to feed ratio | 0.1 to 0.4 $m^3$/kg feed for fresh water |
| | 0.5 to 2.5 $m^3$/kg feed for seawater |
| pH of make up water | 7.8 for fresh water |
| | 8.1 for seawater |
| $Ca^{2+}$ concentration in the incoming water | 82 mg Ca/L (for fresh water only) |

TABLE 1-continued

Parameters that were used for water quality simulation in fresh and seawater RAS operation

| Parameter | Value |
|---|---|
| Total inorganic carbon concentration ($C_t$) | 3 mM for fresh water<br>2 mM for seawater |
| $1^{st}$ apparent equilibrium constant of carbonate system | $10^{-6.37}$ for fresh water<br>$10^{-5.97}$ for seawater |
| $2^{nd}$ apparent equilibrium constant of carbonate system | $10^{-10.25}$ for fresh water<br>$10^{-9.03}$ for seawater |
| $1^{st}$ ammonia system apparent equilibrium constant | $10^{-9.24}$ for fresh water<br>$10^{-9.44}$ for seawater |
| $CO_2$ gas transfer coefficient | 3.0 l/h for fresh water<br>3.5 l/h for seawater |
| $H_2SO_4$ added to the rearing unit per kg feed | 160 to 180 g for fresh water<br>10 to 180 g for seawater |

The output of the model gives the average pH value in the RAS water, the $CO_{2(aq)}$ concentration, total ammonia nitrogen concentration (TAN) (mg/L), $NH_{3(aq)}$ concentration (mgN/L) and $Ca^{2+}$ concentration (fresh water RAS only). Calculations were based on mass balances for alkalinity, total inorganic carbon (for fresh water aquaculture only) and calcium ions. Since this simulation does not include the ion-exchange and electrolysis components, a fictitious TAN concentration which develops in the pond water was used. A system of nonlinear equations was generated and solved using the Newton-Raphson method.

Figure 7:
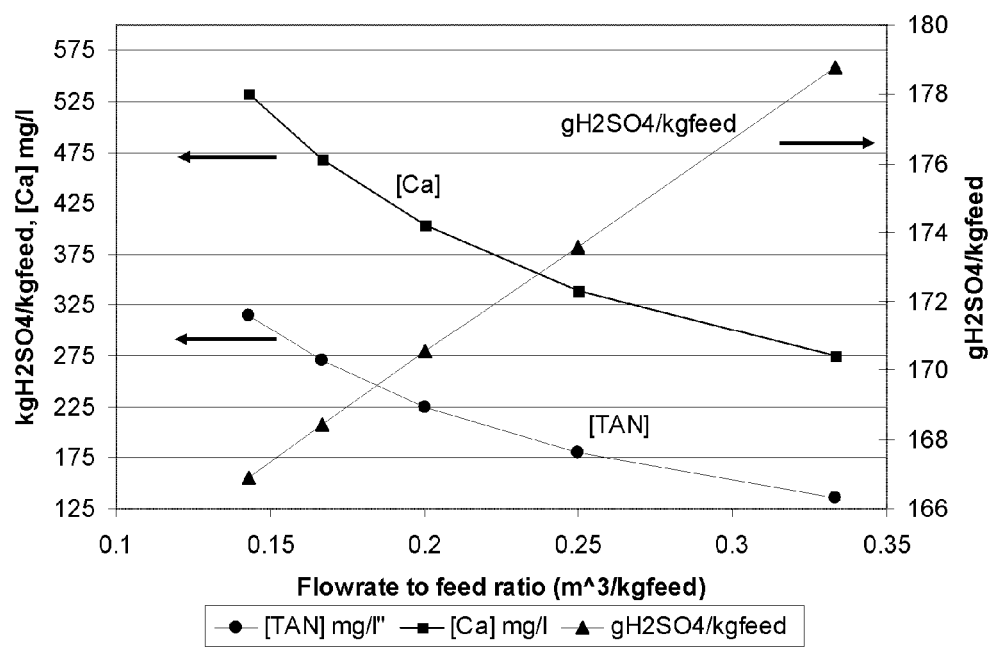
FIG. 7 Fresh water RAS simulation. The amount of sulfuric acid required to maintain pH 7.2 as a function of water flow rate. On the left: the resulting theoretical concentrations of TAN and $Ca^{2+}$.
Figure 8:
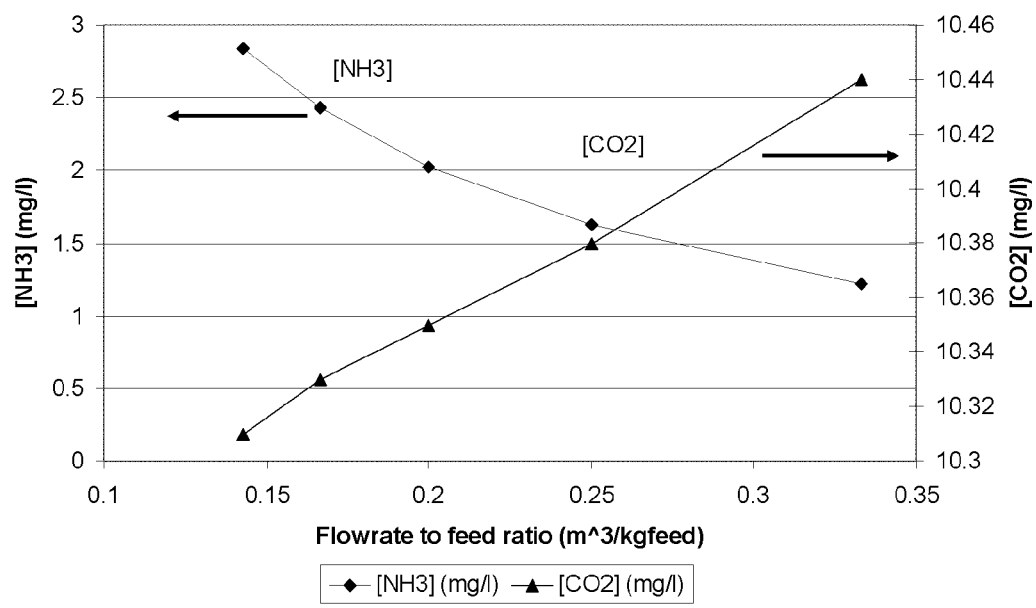
FIG. 8 Simulation of fresh water RAS operation. The amount of sulfuric acid required to maintain pH 7.2 as a function of make up water flow rate and the resulting $NH_3^+$ and $CO_2$ concentrations.

FIGS. 7 and 8 show results from of the fresh water RAS simulation. The required rate of sulfuric acid addition to maintain pH 7.2 in the RAS is 167-179 g $H_2SO_4$/kg feed for 0.15 to 0.33 $m^3$/kg feed water flow rates. $Ca^{2+}$ concentrations of 275 to 533 mg/L are expected in the water. Actual calcium concentrations are expected to be much lower due to the precipitation of calcium carbonate and calcium phosphate species. $CO_2$ gas transfer coefficient used in simulation ($K_L a$=3.0 l/h) resulted in $CO_2$ concentration in the RAS water close to 10 mg/L. The actual $CO_2$ concentration under given operational parameters strongly depends on the $CO_2$ stripping technology applied. However, the simulation clearly shows that the removal of $CO_2$ from the RAS will not be the limiting factor for successful operation of system. The obtained $NH_3$ concentrations are much higher than the threshold ammonia concentration (<0.1 mg/L) (FIG. 8). Thus, the simulation demonstrates the capability of the system of the present invention to decrease TAN concentration to 15 mg/L by the ion exchange step.

Seawater RAS Simulation Results

Figure 9:
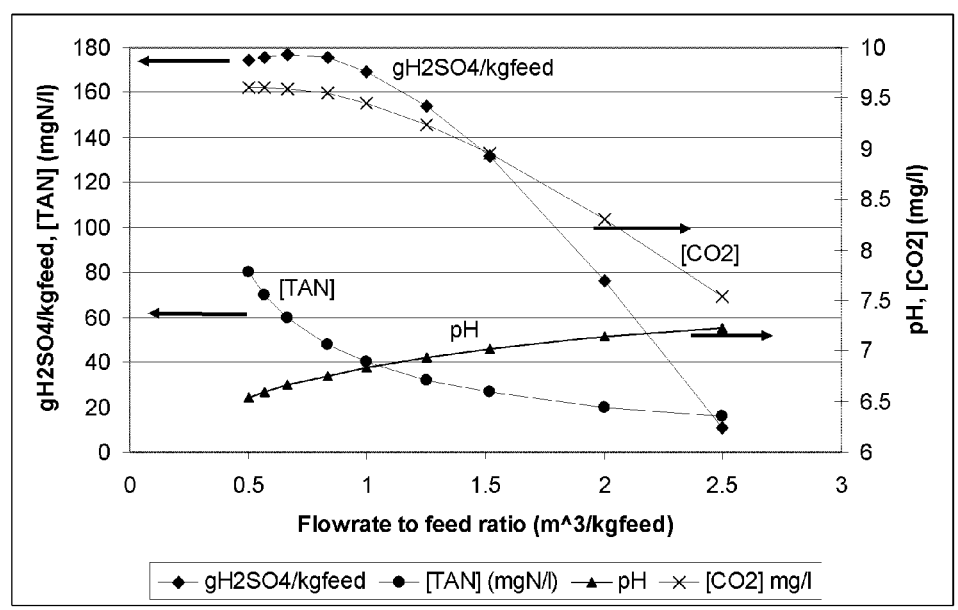
FIG. 9 Seawater RAS simulation results. Sulfuric acid addition rates required to decrease the $NH_3$ concentration to 0.1 mg/L as a function of water flow rate. Further shown is the resulting pH, $[CO_2]$, and [TAN] values.

RAS simulation of sea water (seawater-fed RAS) showed the estimated $H_2SO_4$ addition and the concentrations of $CO_2$, TAN and pH that forms in the RAS water in order to decrease $NH_{3(aq)}$ concentration to 0.1 mg/L for varying incoming seawater flow rates (FIG. 9). The minimal allowed incoming water flow rate was 0.5 $m^3$/kgfeed.

EXAMPLE 4

Case Study and Estimated Costs (Freshwater RAS)

A simulation case study was performed with the following RAS (fresh water) parameters: 100 kg feed/d resulting in 4.5 kg TAN/d (production of 20-25 ton fish/y). The make up water flow rate used in the simulation was 0.3 $m^3$/kg feed→30 $m^3$/d.

Constant TAN concentration assumed in pond=15 mg/L at pH 7.2 ([$NH_3$]=0.1 mg/L). Assuming that the $NH_4^+$ separation step reduces TAN (on average) from 15 to 2 mg/L, the flow rate through the resin column would be 341.54 $m^3$/d (237.18 L/min)

Based on 100 bed volumes (BV) until breakthrough and Hydraulic Retention Time (HRT) of 6 minutes, the required volume of one $NH_4^+$ separation column should be 237.18 L/min*6 min=1.42 $m^3$ which will operate for 100*6/60=10 h until breakthrough. The calculated N absorbed on the zeolite resin at breakthrough is 1420 L*100 BV*13 mg/L=1846 g N per reactor per 10 h.

The calculated capacity of the zeolite resin is: 1846(g)/1420(L)≈1.3 g N/L zeolite or 0.1 eq N/L zeolite (≈6% from the total capacity).

In a four 1.42 $m^3$ zeolite reactors setup, three reactors work during a given 24 h period (8 adsorption hours per cycle) and one reactor is maintained at rest. Preferably, during low cost electricity hours (24:00 to 5:00) the three reactors are regenerated and ammonia is electrochemically oxidized to $N_{2(g)}$. During this time the $4^{th}$ reactor is active. This setup provides safety as well as cost-effectiveness.

The Taoz cost for small plants was assumed to be 0.17 new Israeli shekel (NIS) per kw·h. According to the results (FIG. 4) 2.092 g ammonia (as N) were oxidized during 2.75 h at 4.5 amp and 4.412 V. Consequently, the power requirement for electrooxidation of ammonia is 4.5 (A)·4.412 (V)·2.75 (h)/2.092 gN=26.1 kw/kg N (4.4 NIS per kg N or $1.18 per kg N (exchange rate $1=3.75 NIS)). Thus, the energy requirement expected is 116 kw·h per day with an electricity cost of 19.72 NIS per day (per 100 kg feed per d).

With current efficiency of 97% (FIG. 4), the required current for electrooxidation of 4.44 kg ammonia during low cost electricity hours is:

4.44(kgN)/14(kgN/kmoleN)·3(kmole e⁻/kmoleN) ·96.485 kC/kmole e⁻/18(kC/5 h/A)/0.97=5.26 kA Having a maximal current density of 3 kA/$m^2$, the area of anode=area of cathode=5.26 kA/3=1.75 $m^2$.

Using plate rectangular electrodes of 50X50 cm·cm in a bipolar electrolyzer setup an overall number of 8 electrodes is required. With electrode thickness of 2 mm and interelectrode gap of 8 mm, the overall net volume of the electrolyzing unit is 7.2 cm 50 cm 50 cm=18 L.

In order to obtain the approximate operational expenses, the cost of CaO (added to maintain the pH in the electrolysis reactor constant) is further added to the electricity cost. In addition, the cost of $H_2SO_4$ used to maintain low pH in the rearing unit is also added.

Based on the following (1), (2), (3) and (5) equations hereinabove, 1.0 equivalent of alkalinity is consumed for each mole of $NH_4^+$ oxidized to $N_{2(g)}$. Thus, 2 kg of CaO are required to compensate for the alkalinity loss from the oxidation of 1 kg N, i.e. the cost of CaO is approximately $0.2 per kg N removed. The $Ca^{2+}$ ions that are released to the pond to exchange the $NH_4^+$ ions ($NH_4^+$ separation step) further remove phosphate through $Ca_3(PO_4)_2$ precipitation and inorganic carbon through the precipitation of $CaCO_3$. According to the fresh water-fed RAS simulation results, acid addition rate of about 175 g$H_2SO_4$/kgfeed is required to maintain the pH 7.2 in the RAS water .i.e. 3.9 kg $H_2SO_4$ per 1 kg N. The cost of (food grade) $H_2SO_4$ is ~$150/ton. Thus the cost of the addition of $H_2SO_4$ amounts to $0.59 per kg N removed. It is noted that this is the maximum cost. It is expected that the high $Ca^{2+}$ concentration that develops in the pond is precipitated with both carbonates and phosphates while reducing alkalinity. Thus, the costs for the addition of $H_2SO_4$ are expected to be lower.

The overall estimated Opex (excluding energy requirements) is thus: 1.183+0.2+0.59=$1.97 per kg N removed.

Assuming feed conversion ratio (FCR) of 1.8 kg food per kg fish, it is expected that the cost of N removal (ammonia to $N_2$) and optionally P precipitation are approximately 0.4 NIS per kg fish produced, which is 2%-4% of the production cost of sea-bream and tilapia, respectively, excluding capital cost return.

EXAMPLE 5

Case Study and Estimated Costs (Seawater RAS)

A simulation case study for seawater-fed RAS is performed. The normalized seawater flow rate is 1 m³/kg feed (other main RAS parameters are similar to those used in the seawater-fed RAS simulation; Example 4). According to the modeling results, the expected TAN concentration in the pond water is ~40 mgN/L (based on the assumption that ammonia oxidation does not occur by nitrifying bacteria within the pond). The $H_2SO_4$ addition rate that is required to maintain $[NH_3]$<0.1 mg/L is 4.24 kg$H_2SO_4$/kgfeed (resulting in a pH of 6.84). Thus, the cost for the addition of $H_2SO_4$ amounts to $0.636 per kg N removed (assuming $150/ton $H_2SO_4$). $Ca(OH)_2$ addition for alkalinity compensation (option 1) is 0.2 $/kgN.

Electrolysis step (Option 1): at the end of any given 24 hours, 100 m³ of seawater with 40 mgN/L are collected in a container and, at the low-cost electricity hours, subjected to ammonia electrochemical oxidation. Within 5 hours (24:00-5:00) 4 kg of ammonia (as N) are electro-oxidized. According to the results (FIG. 5), 117 mgN were oxidized within 0.92 hours at conditions of 1 A and 3.46 V, thus the power requirement for ammonia oxidation is 27.21 kWh/kgN. i.e. 4.63 NIS/kgN or 18.5 NIS/d (1.23 $/kgN).

Calculation of the current required for electrooxidation of 4.0 kg ammonia in 5 hours assuming 76% current efficiency:
4.0 (kgN)/14(kgN/kmoleN)·3 (kmole e⁻/kmoleN) ·96.485 kC/kmole e⁻/18(C/5 h)/(A)/0.76=6.04 kA.

Assuming maximal current density of 3 kA/m², the area of anode=area of cathode=5.1 kA/3≈2 m².

If plate rectangular electrodes of 50×50 cm·cm are applied within a bipolar electrolyzer configuration then 9 such electrodes are required overall. Having electrode thickness of 2 mm and interelectrode gap of 8 mm, the overall net volume of the electrolyzer is 8.2 cm·50 cm·50 cm=20.5 L.

The overall estimated Opex (excluding energy requirements) is: 1.23+0.2+0.636=$2.07 per kg N removed.

Electrolysis Step (Option 2):

No RAS effluent is collected during the day. The separate sea water stream is electrolyzed to achieve an appropriate $Cl_2$ concentration. This active chlorine solution is then added continuously to the RAS effluent to oxidize $NH_4^+$ to $N_{2(g)}$ via the breakpoint chlorination mechanism. Having current efficiency of 75% for 2.5 g$Cl_2$/L hypochlorite solution production and required molar $Cl_2$/N ratio of 1.8, the required overall daily volume of the formed $Cl_2$ solution should be:
4 (kgN/d)/14 (kgN/kmole N)·1.8 (mole $Cl_2$/moleN)·70.906(kg $Cl_2$/kmole $Cl_2$)/2.5(kg$Cl_2$/m³)=14.6 m³/d.

Estimation of the active chlorine production cost: According to the results (FIG. 5), the amount of $Cl_2$ produced during seawater electrolysis was:
0.117 mgN·7.6(mg$Cl_2$ required for oxidation of 1 mgN)= 0.89 g$Cl_2$.

Consequently, the power consumption for active chlorine production in seawater is:
1(A)·3.46(V)·0.92(h)/0.89 g$Cl_2$=3.58 kWh/kg$Cl_2$. Thus, the electricity cost for $Cl_2$ production during lowest cost Taoz hours is 131 kWb/d which is 22.3 NIS/d or 1.49 $/kgN.

Required current for electro-generation of 36.5 kg of $Cl_2$ during 5 hours at 75% current efficiency:
36.5(kgN)/70.906(kgN/kmoleN)·2(kmole e⁻/kmole$Cl_2$)·96.485 kC/kmole e⁻/18(C/5 h)/(A)/0.75=7.36 kA.

Assuming maximal current density of 3 kA/m², the area of anode=area of cathode=7.36 kA/3∓3.7 m².

If plate rectangular electrodes of 50×50 cm·cm are applied in bipolar electrolyzer configuration, overall 16 electrodes are required. Assuming electrode thickness of 2 mm and inter-electrode gap of 8 mm, the overall net volume of the electrolyzer is 15.2 cm·50 cm·50 cm=38 L.

The overall estimated Opex (excluding pumping energy requirements) of this option is:
1.49+0.2+0.636=$2.326 per kg N removed.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The invention claimed is:

1. A process for removing nitrogen species from a fresh water recirculated aquaculture system (RAS) while maintaining a total ammonia nitrogen (TAN) concentration in the water in said system between 15 and 50 mgN/L, the process comprising the steps of:
   a. maintaining the pH of the water in the RAS below pH 7.5 by adding an acid;
   b. extracting a portion of the water from the RAS;
   c. passing the portion of the water from the RAS through an ion exchange resin so as to remove $NH_4^+$ ions from the water;
   d. regenerating the $NH_4^+$ enriched ion-exchange resin obtained in step (c) using a solution comprising high concentrations of an exchange cation and chloride as a counter anion at concentrations higher than 50 g Cl/L so as to produce brine containing $NH_4^+$ ions; and
   e. converting $NH_4^+$ ions accumulated in the brine obtained during step (d) to gaseous nitrogen ($N_2$) by electrochemically generating active chlorine species capable of ammonia-to-nitrogen gas oxidation.

2. The process of claim 1 further comprising a step of recycling at least some of the portion of the water obtained after step (c) back to the RAS.

3. The process of claim 2, wherein the exchange cation in step (d) is $Ca^{2+}$, and the process further comprises removing phosphorus species by precipitation with calcium ions released into the water after the ion exchange step (c) when recycling the water back to the RAS.

4. The process of claim 3, wherein the calcium-phosphate salts are separated from the RAS using a solid filter or a separation unit.

5. The process of claim 1, wherein the exchange cation in step (d) is selected from the group consisting of $Ca^{2+}$, $Mg^{2+}$, $Na^+$, and $K^+$.

6. The process of claim 5, wherein the exchange cation in step (d) is $Ca^{2+}$.

7. The process of claim 1, wherein steps (a)-(e) are performed continuously.

8. The process of claim 1, wherein steps (a)-(c) are performed continuously and steps (d-e) are performed during low cost electricity hours.

9. The process of claim 1, wherein the ion exchange resin is selected from the group consisting of a zeolite and a polymeric cation exchange resin.

10. The process of claim 1, wherein the acid is $H_2SO_4$.

11. The process of claim 1, further comprising adding a base during the electrolysis step (e).

12. The process of claim 11, wherein the base is selected from the group consisting of $Ca(OH)_2$, CaO, NaOH and KOH.

13. The process of claim 1, further comprising stripping of $CO_2$ wherein stripping of $CO_2$ comprises the addition of pure oxygen or aeration.

14. The process of claim 1, further comprising repeating steps (a) to (e) in a continuous manner, as needed.

15. The process of claim 1, wherein the exchange cation in step (d) is $Ca^{2+}$, and the process further comprises removing phosphorus species by precipitation with calcium ions added to the RAS to induce precipitation of calcium-phosphate salts.

16. The process of claim 15, wherein the calcium-phosphate salts are separated from the RAS using a solid filter or a separation unit.

17. The process of claim 1, wherein the recirculated aquaculture system (RAS) has a total ammonia nitrogen concentration at 15 or 30 mgN/L.

18. The process of claim 1, further comprising a step of adding CaO or $Ca(OH)_2$ during step (e).

* * * * *